US008511936B2

(12) United States Patent
Van de Riet et al.

(10) Patent No.: US 8,511,936 B2
(45) Date of Patent: Aug. 20, 2013

(54) METHOD AND APPARATUS FOR COASTLINE REMEDIATION, ENERGY GENERATION, AND VEGETATION SUPPORT (75) Inventors: Keith Van de Riet, Troy, NY (US); Jason Vollen, Brooklyn, NY (US); Anna Dyson, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 13/307,414

(22) Filed: Nov. 30, 2011

(65) Prior Publication Data
US 2012/0195685 A1 Aug. 2, 2012

Related U.S. Application Data (60) Provisional application No. 61/418,938, filed on Dec. 2, 2010.

(51) Int. Cl.
*E02B 3/04* (2006.01)
(52) U.S. Cl.
USPC ............... 405/28; 405/35; 405/76; 405/21
(58) Field of Classification Search
USPC ............. 405/15, 16, 17, 21, 24, 25, 26, 27, 405/28, 29, 30, 31, 32, 33, 34, 35, 302.4, 405/302.6, 302.7
See application file for complete search history.

(56) References Cited

U.S. PATENT DOCUMENTS

| 426,807 | A | * | 4/1890 | Harrelson | 405/28 |
| 465,968 | A | * | 12/1891 | Neale | 405/25 |
| 1,646,168 | A | * | 10/1927 | Pringle | 405/32 |
| 1,748,444 | A | * | 2/1930 | Dutton | 405/28 |
| 1,844,484 | A | * | 2/1932 | Smith | 405/32 |
| 1,969,123 | A | * | 8/1934 | Doble | 405/28 |
| 2,135,337 | A | * | 11/1938 | Herbest, Jr. | 405/32 |
| 2,341,515 | A | * | 2/1944 | Rehfeld | 405/32 |
| 4,118,937 | A | * | 10/1978 | Mansen | 405/30 |

(Continued)

FOREIGN PATENT DOCUMENTS
JP 07-247528 9/1995

OTHER PUBLICATIONS

Massel et al., "Surface wave propagation in mangrove forests," Fluid Dynamics Research 24 (1999) 219-249.

(Continued)

*Primary Examiner* — Frederick L Lagman
(74) *Attorney, Agent, or Firm* — RatnerPrestia (57) ABSTRACT

A biomechanical structure for coastline remediation includes one or more structural assemblies. The structural assemblies include a distribution of one or more members; one or more anchors connected to each of one or more members; and one or more connection members. The anchors employed by the biomechanical structure may be fixed, floating, or a combination of fixed and floating anchors. The structural assemblies may be staggered, inline, or semi-random in configuration. The biomechanical structure may include metals, composites, polymers, biodegradable materials, or combinations thereof in its components. The biomechanical structures may incorporate one or more components for mechanical or material power generation. The biomechanical structures may include one or more seed capture devices, such as baskets or mesh. A biomechanical system for coastline remediation includes one or more biomechanical structures. A method for coastline remediation includes the step of incorporating a biomechanical system into the existing coastline morphology.

13 Claims, 11 Drawing Sheets

(56) References Cited

U.S. PATENT DOCUMENTS

| | | | |
|---|---|---|---|
| 4,710,056 A * | 12/1987 | Parker | 405/15 |
| 4,738,563 A * | 4/1988 | Clark | 405/52 |
| 4,836,709 A * | 6/1989 | Ploeg et al. | 405/31 |
| 4,861,193 A * | 8/1989 | Newkirk | 405/28 |
| 5,338,131 A | 8/1994 | Bestmann | |
| 5,348,419 A * | 9/1994 | Bailey et al. | 405/21 |
| 5,454,665 A * | 10/1995 | Hughes, Sr. | 405/24 |
| 5,556,229 A * | 9/1996 | Bishop et al. | 405/27 |
| 5,620,279 A * | 4/1997 | Furusawa et al. | 405/24 |
| 5,678,954 A * | 10/1997 | Bestmann | 405/24 |
| 5,720,573 A * | 2/1998 | Benedict et al. | 405/21 |
| 5,807,024 A * | 9/1998 | Benedict | 405/32 |
| 5,884,585 A * | 3/1999 | Streichenberger | 405/26 |
| 5,944,443 A * | 8/1999 | Benedict | 405/21 |
| 5,951,202 A * | 9/1999 | Brown | 405/19 |
| 6,210,072 B1 * | 4/2001 | Marelius | 405/100 |
| 6,244,218 B1 * | 6/2001 | McNeil | 405/24 |
| 6,547,493 B2 * | 4/2003 | Spangler et al. | 405/302.6 |
| 6,935,808 B1 * | 8/2005 | Dempster | 405/28 |
| 6,976,807 B2 * | 12/2005 | King et al. | 405/26 |
| 7,461,998 B1 * | 12/2008 | Parnell et al. | 405/21 |
| 2002/0110422 A1 | 8/2002 | Hulsemann | |
| 2006/0088381 A1 | 4/2006 | Manzone et al. | |

OTHER PUBLICATIONS

Mazda et al., "Drag force due to vegetation in mangrove swamps," Mangroves and Salt Marshes 1: 193-199, 1997.

Gibbs, "Estuarine Flocs: Their Size, Settling Velocity and Density," Journal of Geophysical Research, vol. 90, No. C2, pp. 3249-3251, Mar. 20, 1985.

International Search Report for PCT International Application No. PCT/US2011/062512 mailed Jun. 28, 2012.

* cited by examiner

FIG. 1A

FIG. 1B $V = abh$

METHOD AND APPARATUS FOR COASTLINE REMEDIATION, ENERGY GENERATION, AND VEGETATION SUPPORT

CROSS REFERENCE TO RELATED APPLICATIONS

The application claims priority from U.S. Provisional Application No. 61/418,938, filed Dec. 2, 2010, the contents of which is herein incorporated by reference in its entirety for all purposes.

FIELD OF THE INVENTION

The present invention relates generally to coastline remediation. Specifically, the present invention relates to a method for coastline remediation using structures which integrate wave energy dissipation and harvesting, soil erosion control, and vegetation support mechanisms.

BACKGROUND OF THE INVENTION

Historical coastal urban development established buildings and civil structures along shorelines and extending to the water's edge, eliminating the critical transition of the tidal zone. Features of urban edges, such as seawalls or rigid pile structures, are exposed to wave energy, which causes scour and increases erosion rates near cities. These large-scale urban edges eliminate protective landscape features, which exacerbates the effects of sea level rise (overexposure to storm waves) and environmental catastrophe (hurricane or tsunami). In contrast to this, native shoreline ecosystems stabilize the shoreline with interconnected root structures and compliant features that absorb and dissipate wave energy.

Numerous prior art structures and devices have been devised to reduce or eliminate the tendency for shoreline erosion caused by waves varying in strength from normal wave action to storm or hurricane levels. Recently, more emphasis has been placed on the conservation of the natural shorelines as changing weather patterns and rising sea levels have increasingly effected the rate of coastal erosion. Several conventional planning approaches exist that attempt to manage the range of movement typical for a coastal zone. These approaches include: conservation, artificial barrier islands, wetland establishment, coastal re-alignment, shoreline reclamation/beach nourishment, and seawall/bulkhead construction.

Many of the known methodologies seek to provide wave energy absorption and dissipation by incorporating one or more of wave reflection (counter-force) and refraction (change in angular direction). Some existing approaches for coastal remediation also attempt to preserve native vegetation and incorporate such flora into the erosion prevention scheme. Various coastal vegetations have been considered in this regard. For example, systems employed in tropical climates have sought to preserve and incorporate mangrove forests. Studies have shown that mangrove ecosystems are being lost faster than the rainforests. These intertidal forests are essential to complex land and marine ecosystems and responsible for filtering agricultural and urban runoff, primary fish habitats, and biodiversity linked to a complex network of ecological criteria. Native littoral zone ecosystems (including, for example, mangrove and sea grass) stabilize the shoreline with root structures and compliant features that absorb and dissipate wave energy.

Existing mangrove ecosystem regeneration efforts vary in scale and implementation. Mangrove seedlings are opportunistic colonizers and are typically planted directly in tidal flats. The seedlings' roots have exceptional gripping capacity and can take hold of porous substrates, such as stone or existing mangrove roots. These ecosystems are intertidal and therefore maintaining or restoring proper hydrological regime (tidal cycle) is critical to success of a replanting effort. Known remediation methodologies utilizing wave refraction seek to cause eddy turbulence to allow seedlings to settle out and take root into the soil.

One known remediation solution for mangroves is a reef ball system, utilizes a seedling planter that is placed directly in the soil and used to secure the seedling against wave energy. Additional methods to protect young seedlings utilize PVC pipes as 'sleeves' or bamboo stakes that hold seedlings against wave energy. All of these planters lack the vertical depth required to account for deep-water habitats that exist alongside urban features such as seawalls or bulkheads. Conventional planters can only be applied when tidal flats are present to provide the intertidal substrate necessary for mangrove seedlings. Although replanting strategies have success in some areas, conventional techniques fall short of accommodating the requirements of other regions such as urban environments.

SUMMARY OF INVENTION

The inventors of the present invention have now discovered a novel apparatus and method for coastal bioremediation which protects and reinforces urban and indigenous vegetation features. The geosynthetic landscape solution dissipates wave energy, mitigates erosion, and regenerates critical vegetation habitat within compromised tidal zone environments. The present invention integrates human and natural systems to amplify the ordinary range of performance capable from either system operating alone. Embodiments of the present invention enhance shoreline protection services of native vegetation ecosystems by strengthening and augmenting the wave reducing characteristics that contribute to their overall effectiveness under normal and extreme weather conditions.

To meet this and other needs, and in view of its purpose, the present invention provides a biomechanical structure for coastline remediation which comprises one or more structural assemblies. The structural assemblies are comprised of a distribution of one or more members; one or more anchors connected to each of one or more members; and one or more connection members. Connection members may be employed, for example, to connect the assembly to similar assemblies within the biomechanical structure or to other structures within the biomechanical system. The anchors employed by the biomechanical structure may be fixed, floating, or a combination of fixed and floating anchors. For example, fixed anchors may include caissons, auger and screws, or pile foundations, while floating anchors may include vibroflotation anchors. The structural assemblies may be staggered, inline, or semi-random in configuration.

As detailed further below, the biomechanical structure may include components which are comprised of metals, composites, polymers, biodegradable materials, or combinations thereof. In one or more embodiments of the present invention, these components may be comprised of biodegradable materials which are seeded and nutrient-laden. In at least some embodiments, the biomechanical structures incorporate one or more components for mechanical or material power generation. For example, wave energy may be harvested by interaction of the components with the wave or each other in the rotation, flexion, or linear compression direction. The biomechanical structures may further include one or more seed capture devices, such as baskets or mesh.

In another embodiment, the present invention provides a biomechanical system for coastline remediation which comprises one or more biomechanical structures. The biomechanical system may include either fixed or floating anchors, or a combination of both types of anchors. The biomechanical structures which comprise the system may be a combination of one or more of the following configurations: staggered, inline, and semi-random. The components of the biomechanical system may be comprised of metals, composites, polymers, biodegradable materials, or combinations thereof. The biomechanical system may incorporate one or more components for mechanical or material power generation. Similarly, the biomechanical system may incorporate one or more seed capture devices.

In yet another embodiment, the present invention provides a method for coastline remediation which comprises incorporating into the existing coastline morphology a biomechanical system. The method for coastline remediation may further include integrating native vegetation into the biomechanical system. For example, a native vegetation, such as a mangrove forest, may be seeded, captured, and nurtured by the biomechanical system to integrate it into the system as the vegetation grows.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawings are the following Figures:

FIGS. 1A-1C illustrate the remediation capacity of a native vegetation ecosystem (Sources: FIG. 1A from Massel, S. R., K. Furukawa, R. M. Brinkman 1999. "Surface wave propogation in mangrove forests," *Fluid Dynamics Research* 24: 219-249; FIG. 1B from Mazda, Y. E., B. Wolanski, A. King, D. Ohtsuka, and M. Magi 1997. "Drag force due to vegetation in mangrove swamps," *Mangroves and Salt Marshes* 1(3): 193-199.;

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The inventors of the present invention have now discovered a biomechanical structure that dissipates coastal wave energy with networks that capture and support vegetation, such as mangrove forests, within intertidal environments. The biomechanical structures function, in part, by reducing tidal wave energy. A reduction in wave energy as it approaches the shoreline, and the resulting wave refraction, allows the suspension rates for targeted particle diameters to be lowered. This increases sediment fallout and promotes accretion. The structural system of the present invention provides a critical landing surface for waterborne seedlings and partner species in order to instigate ecosystem regeneration in areas that lack tidal zones or are overexposed to incoming wave energy.

The system's flexible networks structurally reinforce the attached biological components by enhancing anchor points to the sea bottom while allowing for a range of movement that corresponds to shifts in the landscape at spatial scales of coastal morphology. Accordingly, the biomechanical structure can be entirely rigid, entirely flexible, or have both sections that are rigid and sections that are flexible to accommodate the range of movement necessary for specific coastal morphology. Once colonized, the engineered system may contribute additional density, strength, and surface features to the vegetation to amplify the shoreline protective functions of the natural biological systems.

Additionally, the biomechanical structure can be fixed, floating, or combine both fixed and floating portions. For example, the inland portion of the structure may be fixed to the coastal landmass while the deep-water portion may be allowed to float. In deep-water conditions, the present system may elevate the planter substrate to create a tidal zone attachment surface within the natural range of waterborne seedlings. This strategy circumvents the challenge of lacking a soil substrate. The seedling initially takes root in the elevated planter substrate, though once established, successive root growth would extend downward to the sea bottom under gravitational pull. As an example, the rhizophora mangle species characteristically extends roots from upper branches to the soil as a means of supporting its horizontal branch growth. These buttressed root systems ultimately increase the structural tie between tree and engineered system and the landscape.

As described above, the biomechanical system of the present invention amplifies the wave protection characteristics of native shoreline vegetation through enhanced wave-dragging geometries and augmented, i.e., biomechanically-supported, root anchorage. The anchors of the biomechanical system can be interspersed to allow movement within a defined boundary or portion of the system. Similarly, the structural components of system can be arranged to emulate native ecosystem vegetation geometries to create an artificial habitat. Seedling capture devices can be incorporated to further enhance the system's ability to intercept and cradle waterborne seedlings, thereby fostering greater retention and nurturing of the native vegetation. The stability of the system at network-scale can increase the integrity of coastline landmass and extend the usable shoreline for programmatic functions including recreation, integrated food and resource culture, and protective buffers to urban infrastructural networks.

In addition to dissipating wave energy, the biomechanical system of the present invention may incorporate movable structures or energy-generating materials to harvest wave energy for useful purposes. The harvested energy may be utilized locally to, for example, generate an electrical current within the system to instigate biodeposition of vegetation seedlings and/or electrodeposition of seawater constituents, such as calcium, on the system's structural members. Alternatively, or additionally, the harvested wave energy may be collected and transmitted to a remote location for use or for integration with existing electric grids. As discussed further below, various electrical energy power generation and wave energy harvesting mechanisms can be incorporated into the biomechanical structure for such purposes. These energy harvesting mechanisms can include, for example, mechanical power generation components or power generation materials.

Figure 1A:
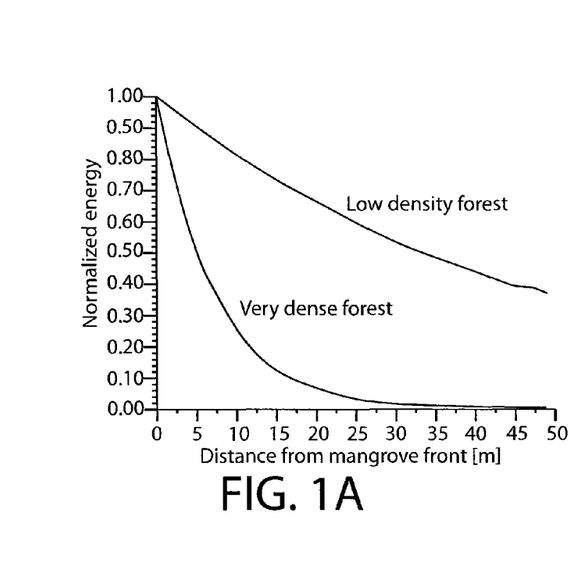
Figure 1B:
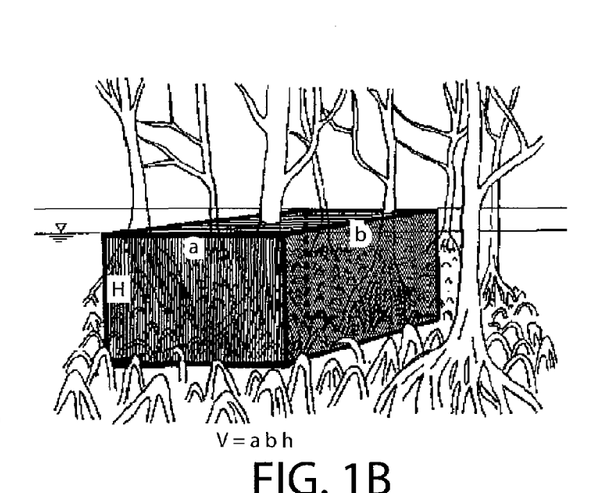
Figure 1C:
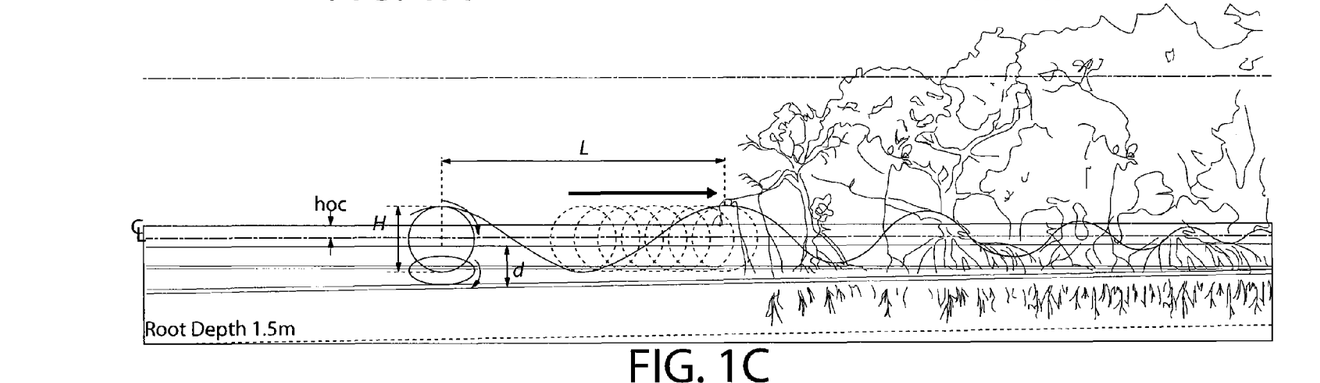

FIGS. 1A and 1B show the wave dissipation of a native vegetation ecosystem, specifically a native coastal mangrove forest. FIG. 1A graphically shows the dissipation of wave energy as a wave progresses through a distance of native mangrove forest. As understood by one having ordinary skill in the art, a very dense forest may achieve higher initial wave energy dissipation (i.e., greater or quicker dissipation) than a low density forest. However, a more dense forest may not be favorable in terms of structural rigidity, soil retention or erosion, environmental habitation, and ecosystem aesthetics, among other reasons. These factors may be considered in addition to the root density, as shown in FIG. 1B, to determine the necessary wave dissipation parameters. Reduction in wave velocity and water turbulence are related to root density and surface area, both of which relate to particle suspension rates within the ecosystem matrix. FIG. 1C diagrams the wave dissipation by a mangrove forest as the wave traverse the native ecosystem. As shown, the wave energy is reduced by the densely tangled prop roots of the mangrove forests. Dense forests have been found to reduce normal wave energy within 50 meters of the seaward-side (i.e., the deep-water end). The height H, from crest to trough, of the wave as it oscillates upon the wave cycle center-line ($C_L$), the length L from crest to adjacent crest, and the depth d from still-water surface to sea floor can impact the reduction capacity of the vegetative system. Mangroves and other shoreline vegetation are effective at reducing wave energy but migrate large distances with shoreline change, which can occur as sea levels fluctuate or as a result of extreme weather events.

Figure 2A:
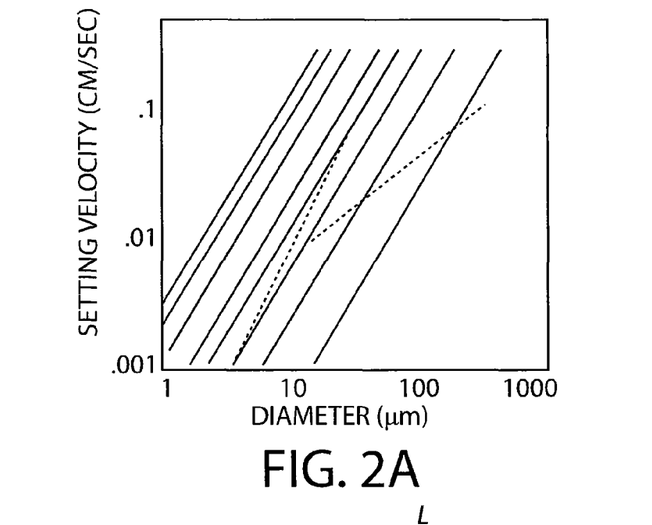
FIGS. 2A-2B illustrate the wave interaction and pressure on a typical manufactured bulkhead environment (FIG. 2A from Gibbs, Ronald J. 1985. "Estuarine Flocs: Their Size, Settling Velocity and Density," *Journal of Geophysical Research* 90(C2): 3249-3251.)
Figure 2B:
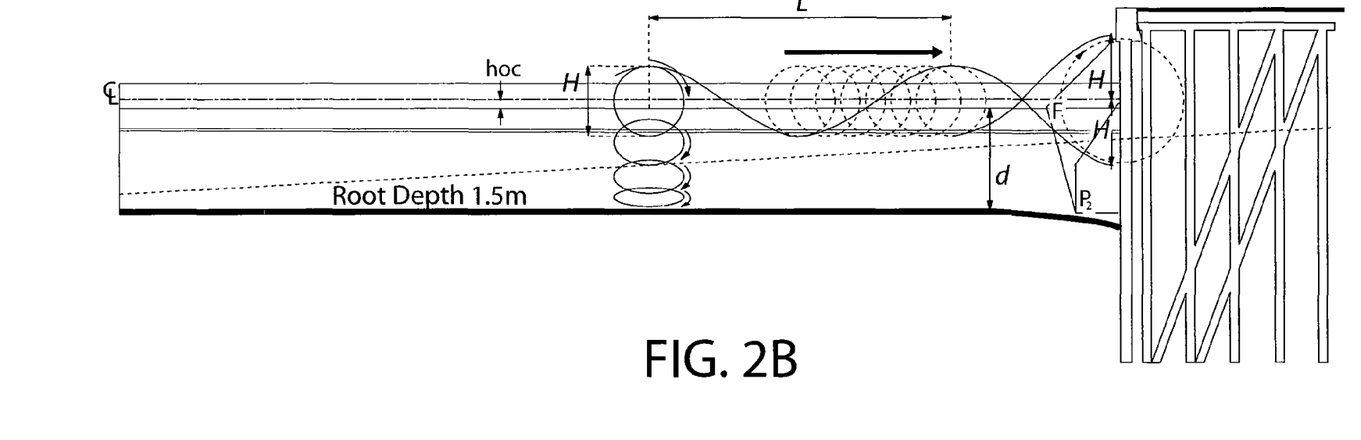

Urban and modified shorelines which utilize seawalls or bulkheads do not effectively dissipate wave energy and protect the landscape from erosion. As shown in FIGS. 2A and 2B, hard edges such as those in urban seawalls fail catastrophically because there is no room for change. Upon meeting the wall, water velocity is found to be accelerated, which alters the bathymetry by scour. Over time, scour and erosion by repeated wave impact eliminate the integrity of these protective landscape features. This can occur by impact by the clapotic wave at the wall, scour at the toe of the wall, or through other means. The pressure on the wall at the stillwater level, $p_1$, and at the sea floor, $p_2$, may be calculated by the following equations:

$$p_1 = (\gamma d + p_2)\frac{H + h_{0c}}{H + h_{0c} - d} \quad \text{Equation 1}$$

$$\gamma d \pm p_2 = \gamma d_2 \pm \frac{\gamma H}{\cosh 2\pi d / L} \quad \text{Equation 2}$$

where $\gamma$ is the specific weight of water, H is the height of a wave from crest to trough, d is the depth of water from stillwater surface to bottom, $h_{Oc}$ is the height of the centerline of wave rotation, and L is the length of a wave from crest to adjacent crest.

Additionally, these man-made structures are non-regenerative of the native shoreline, as they do not cause sedimentation, and do not serve as habitats for native flora or sea life. The biomechanical structures of the present invention utilize targeted settling velocities for multiple diameter particles, density, and distribution to mimic an 'ideal' biological and mechanical structure.

Figure 3A:
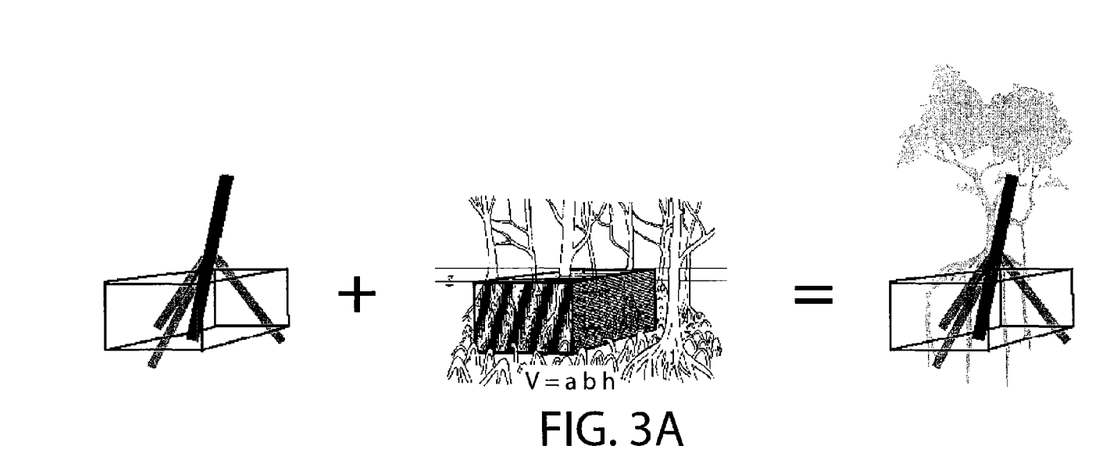
FIGS. 3A-3B illustrate a reinforced shoreline which incorporates a biomechanical structure according to one embodiment of the present invention.
Figure 3B:
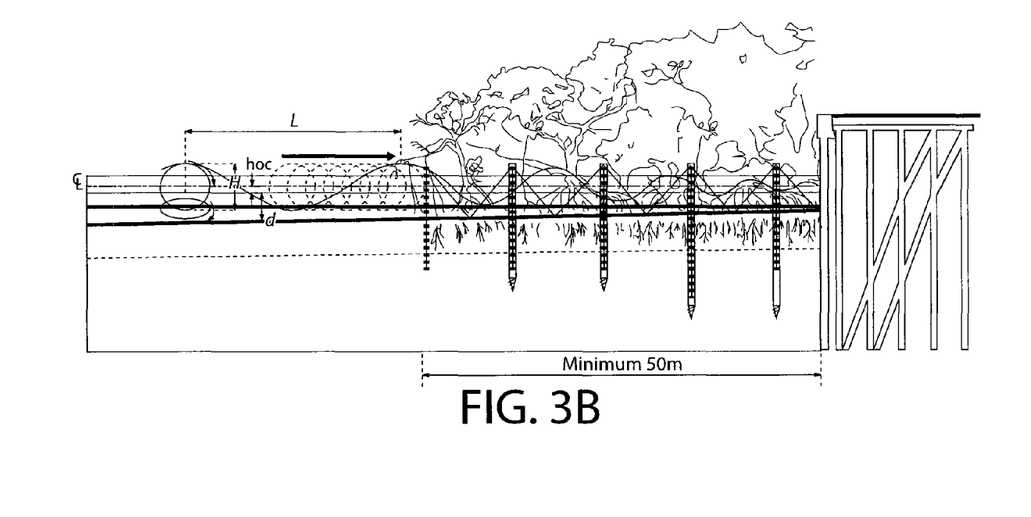

FIGS. 3A and 3B show one such embodiment of the present invention. FIG. 3A shows a biomechanical structure which mimics the density and volume of a native vegetation ecosystem, specifically a mangrove root system. The resulting biomechanical structure provides coastal remediation and native vegetation support. As FIG. 3B shows, a biomechanical structure according to this embodiment of the present invention may be utilized at an urban or modified shoreline to dissipate wave energy in advance of the wave reaching the seawall. Such a coupled biological and man-made system combines the dissipation capacity of a native vegetation ecosystem and strengthens the root system with biomechanical integration. The biomechanical structure can anchor the native vegetation against extreme conditions and provide support for continued growth of the flora. The system can be designed to achieve necessary wave dissipation and can incorporate other facets, such as urban aesthetic design, wave energy harvesting, and coastline habitats, among others.

Figure 4:
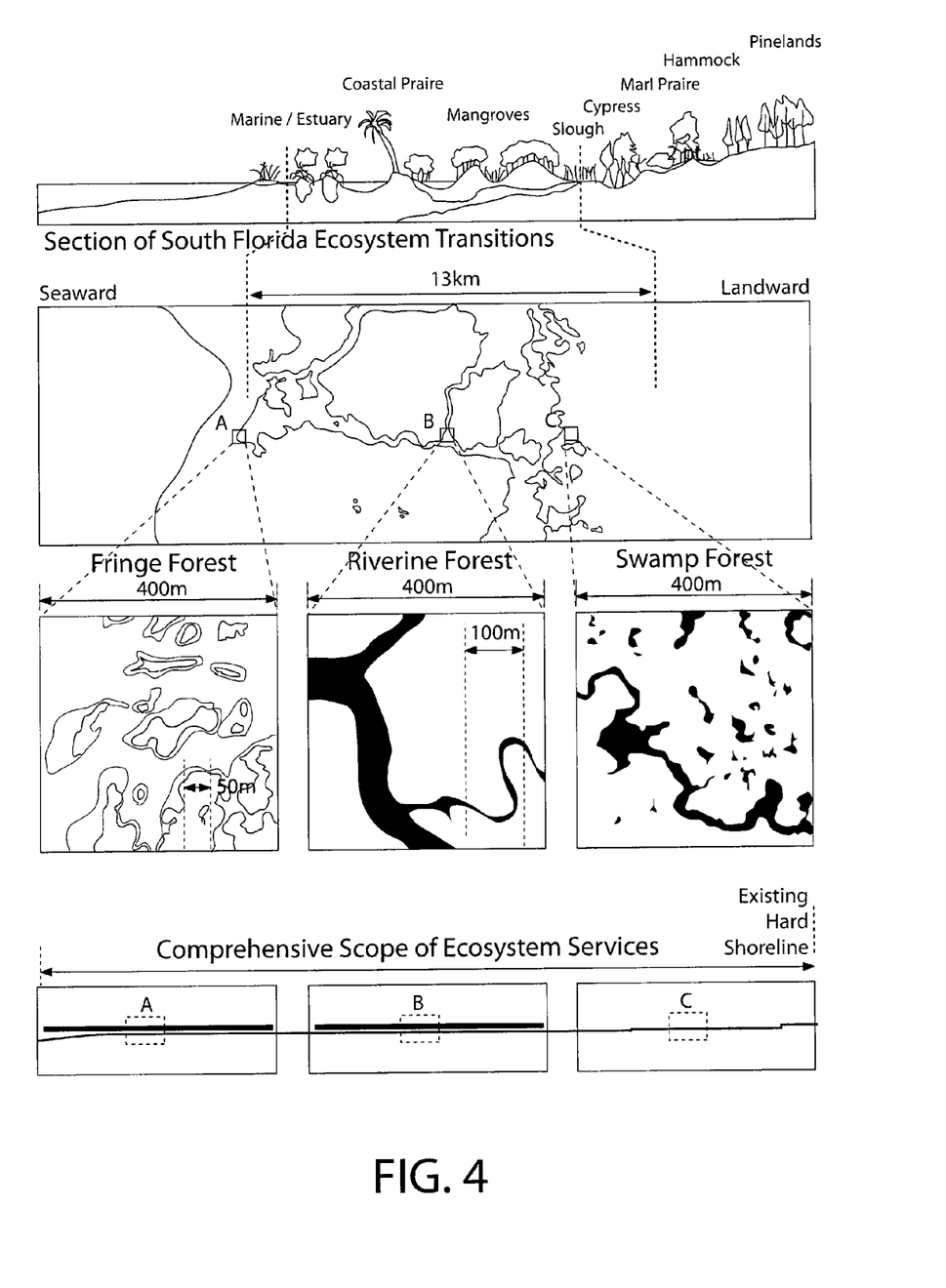
FIG. 4 shows a myriad of coastal morphologies for which the embodiments of the present invention may be tailored.

The biomechanical systems of the present invention can be modified to meet the requirements and desires of the regional morphology. As shown in FIG. 4, the morphology of a coastal ecosystem may include multiple vegetation regimes and landmass structures. The inland, or landward, portion of the coastal morphology may contain vegetation and landmass typical of a hard shoreline. The vegetation along the hard shoreline may serve the ecological service of anchoring the landmass and preventing soil erosion. The deep sea, or seaward, portion of the coastal morphology may contain vegetation and landmass typical of a floating shoreline. The floating shoreline may provide the ecological service of capturing vegetation seedlings and dissipating wave energy. The morphology of the region between these points can mix the ecological services of the hard and floating shorelines. This region may enable seedling retention and sedimentation. These ecological services are tightly coupled to the morphology of the coastal ecosystem. The structural characteristics of the biomechanical systems of the present invention can be adapted to integrate with the existing or native ecosystem morphology.

Figure 5A:
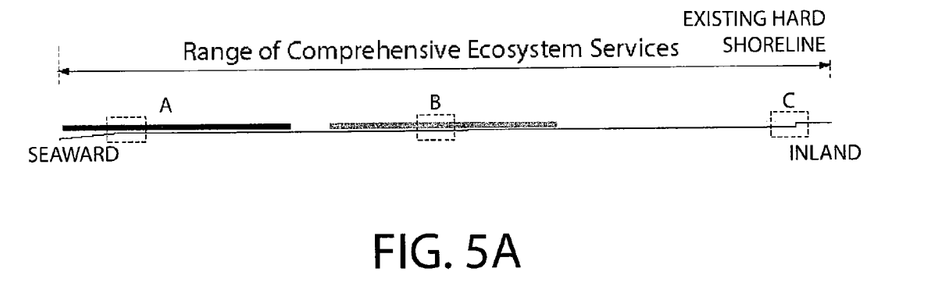
FIGS. 5A-5D illustrate biomechanical system assemblies according to various embodiments of the present invention.
Figure 6:
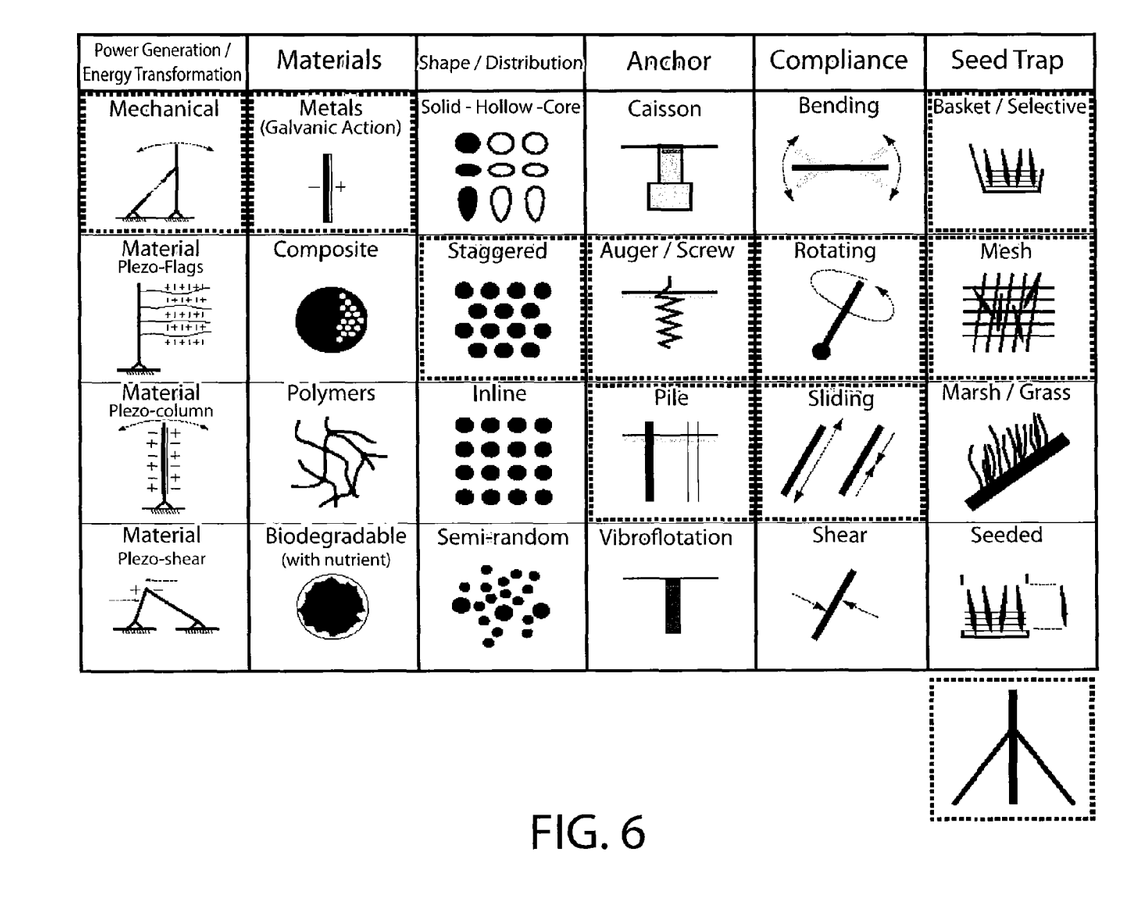
FIG. 6 shows a range of characteristics which may be employed in one or more embodiments of the present invention.

For example, FIG. 5A shows the range of ecosystem services that can be met by one or more embodiments of the present invention. The flexibility of the biomechanical system is relative to the ecosystem morphology. The structural features can be "tuned" (e.g., spaced, sized, constructed) to match parameters such as wave periodicity to reduce wave energy and decrease particle suspension. As discussed below, FIG. 6 shows a table of exemplary structural components, materials, and performance characteristics that can be incorporated to provide the desired ecosystem services, structural integrity, and ecological compliance necessary for the coastal morphology. FIG. 5A shows one embodiment of the biomechanical system which employs three types of biomechanical structures to match three different portions of the coastal morphology. As can appreciated by one having ordinary skill in the art, these components, materials, and characteristics can be utilized in any combination, and can incorporate other features within contemplation of the present invention, to provide the desired ecosystem services, structural integrity, and ecological compliance necessary for the coastal morphology.

Figure 5B:
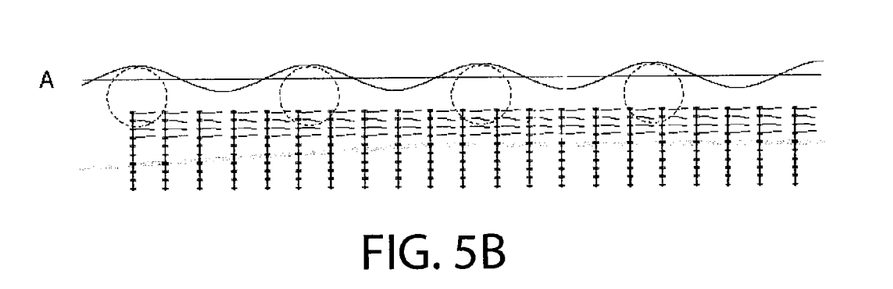

FIG. 5B shows an embodiment of the biomechanical structure that can be utilized at, for example, a seaward end of the system. Piezo-flags and piezo-columns can be utilized to cause drag forces which induce the waves to begin breaking. The distribution of these components can be such that they form a sea grass habitat. The piezo-flags and piezo-columns can function to dissipate and harvest wave energy. The structures may cause a drag force, for example, which may induce the wave to begin breaking. The energy harvested from these components can be utilized locally to generate an electrical current within the system to promote biodeposition of vegetation seedlings and/or electrodeposition of seawater constituents, such as calcium, on the system's structural members. Such constituents are known to be effective substrates for sea fauna such as oysters. Alternatively, or additionally, the harvested wave energy may be collected and transmitted to a remote location for use or for integration with existing electric grids. Accordingly, this embodiment of the biomechanical structure may provide a number of ecological services including, for example, wave energy dissipation and harvesting, seedling capture and biodeposition, electrodeposition of seawater constituents, and vegetation habitat.

Figure 5C:
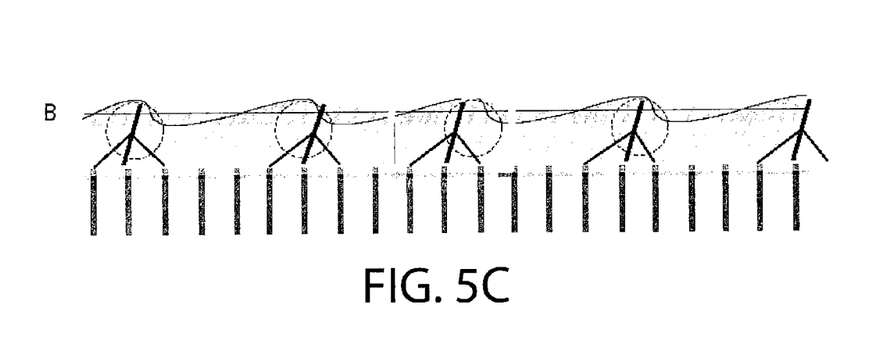

FIG. 5C shows an embodiment of the biomechanical structure that can be utilized at, for example, an intermediate section of the system. The biomechanical structure at this region of the coastal morphology interfaces with the breaking waves to dissipate and harvest the maximum wave energy. The wave energy is absorbed by the biomechanical structure, which can be fixed to the coastal bed. The biomechanical structure functions, in part, by reducing tidal wave energy. A reduction in wave energy as it approaches the shoreline, and the resulting wave refraction, allows the suspension rates for targeted particle diameters to be lowered. This increases sediment fallout and promotes accretion. Accordingly, this embodiment of the biomechanical structure may provide one or more ecological services including, for example, wave energy dissipation and harvesting, soil bed and landmass retention, particle suspension, seedling capture, and vegetation support. This embodiment of the present invention is detailed further in FIGS. 7 and 8 below.

Figure 5D:
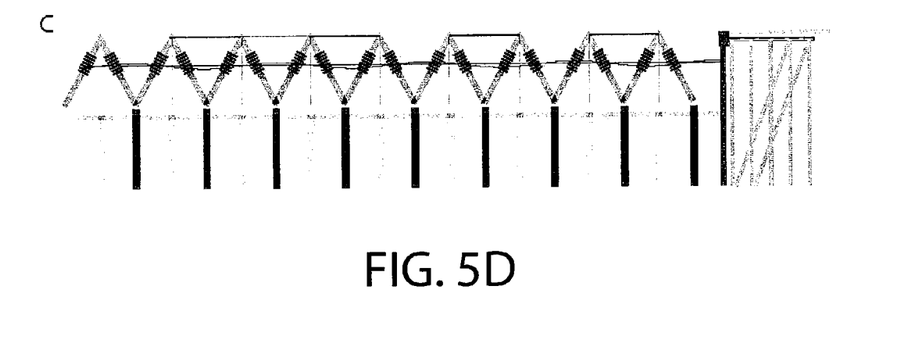

FIG. 5D shows an embodiment of the present invention that can be utilized, for example, at the inland or landward end of the biomechanical system. Shown here, the biomechanical system is employed adjacent to, and on the seaward side, of a rigid seawall. The biomechanical system may be more rigidly implanted, i.e., fixed, into the soil bed or landmass to prevent soil erosion. At this portion of the ecological morphology, wave energy is largely dissipated and the biomechanical structure functions more as structural reinforcement of the vegetation, a habitat for both flora and sea life, and as a connection to existing urban infrastructure. Additionally, the biomechanical structure may serve as a remediation buffer for storm surges and hurricane scenarios. Accordingly, this embodiment of the biomechanical structure may provide a myriad of ecological services including, for example, soil bed and landmass retention, particle suspension, seedling capture, and vegetation support.

As understood by a skilled artisan, the components, materials, and characteristics of the present invention may be utilized in any combination, and can incorporate other features within contemplation of the present invention, to provide the desired ecosystem services, structural integrity, and ecological compliance necessary for the coastal morphology. These design parameters may be adjusted to meet the requirements of a particular landscape assembly. For example, a particular combination or selection of design parameters may be necessary to meet the stiffness and biodegradability requirements of a specific coastal morphology. In some scenarios the morphology may demand that the biomechanical structures be rigid or permanent, while in other scenarios the structures may be desired to act only as temporary supports and substrates until the coastal vegetation reaches maturity. Therefore a range of materials will be necessary depending on, for example, where a structure sits relative to the constructed shoreline and the amount of wave energy it is anticipated to confront.

FIG. 6 details some of the characteristics that may be employed in embodiments of the present invention to meet the requirements of the coastal morphology and desires of the local environment. The biomechanical structures of the present invention may incorporate both mechanical and material power generation mechanisms. For example, wave energy may be harvested or generated by mechanical motion such as rotation, flexion, linear compression, and the like. Additionally or alternatively, wave energy may be harvested or generated by material power generation methods such as piezoelectric interaction within or between materials. The biomechanical structures may incorporate specific materials for such purposes. For example, the structure may incorporate a range of metals to utilize galvanic action. Similarly, the biomechanical structures may incorporate composite or ceramic materials, polymers, and biodegradable materials. The structural members may be porous to allow water passage and seedling capture along or through the assembly. The materials and structural members can be mixed purpose within a specific assembly or biomechanical structure, i.e., the biomechanical system may incorporate a mix of structures, materials, configurations, and characteristics, to meet the desired goals of the system.

The shape and distribution of the biomechanical structures can also be modified to meet the desired goals of the coastal morphology. For example, a solid structure may be employed in some situations while a hollow structure is preferred in other scenarios. The biomechanical structure can be arranged in a staggered layout or the components of the structure may be in-line. Alternatively, a semi-random structure may be preferred to meet the demands of the specific coastal morphology. Of course, these shapes and distributions are not exclusive and one or more of these design parameters may be employed concurrently. The biomechanical structure and system may utilize an inter-connected infrastructure, such as that commonly known as a 'tensegrity' structure. In such a system, the structural components are a mix of compression members and tensile members. The overall structure is allowed to flex within a certain boundary, but is retained together by an arrangement of inter-connectivity between the compression members and the tensile members. A tensegrity structure may be appropriate, for example, as part of constructed landscapes where high degrees of stiffness and general porosity are simultaneously required. The parameters and placement of the compression and tensile members, as well as the component materials and characteristics, can be adjusted to yield the desired goals of the system.

The shape and distribution of the biomechanical structure will, in some situations, depend on the particle suspension desired by the biomechanical system. Additionally, the characteristics employed by the biomechanical structure will depend on the region of the coastal morphology at which the system is to be utilized. As discussed above, the biomechanical structure may be adapted to be utilized at the inland portion, the seaward portion, or any portion in between along the coastal morphology and the needs of the ecosystem may be considered in selecting the characteristics of the biomechanical structure.

The biomechanical structure may be fixed, floating, or combine both fixed and floating portions. For example, the inland portion of the structure may be fixed to the coastal landmass while the seaward portion may be allowed to float. FIG. 6 shows a number of anchoring mechanisms. Caissons, auger and screws, or pile foundation assemblies may be employed to retain the biomechanical structures in place in a fixed or pseudo-fixed arrangement. Alternatively, or additionally, some portion of the biomechanical structure may be allowed to float, such as by vibroflotation. However, the biomechanical structures of the present invention are not limited to these anchoring mechanisms and any such means for securing the structure can be employed, as can be appreciated by one having ordinary skill in the art. The embodiments of the present invention integrate anchoring mechanisms that are necessary or preferred for the specific coastal morphology. Additionally, the characteristics of the biomechanical structures are selected to compliance with the ecological morphology. Accordingly, the biomechanical structure may be adapted to allow bending, rotation, sliding, shear, or any other range of motion necessary for compliance with the local environment. This range of motion can also consider the desired energy potential generated from wave energy harvesting, as described above.

The biomechanical structure can also be arranged or constructed to serve specific seed capture, vegetation support, or habitat purposes. For example, the biomechanical structure may incorporate a basket configuration for seedling capture. The basket may itself be configured for selective capture of, for example, seedlings of a particular size. The biomechanical structure may similarly incorporate a mesh for seed trap purposes. Additionally or alternatively, the biomechanical structure may be integrated with native vegetation, such as marsh or grass, prior to implementation in the ecological morphology. Similarly, the biomechanical structure may be seeded to promote vegetation growth and establish a biomechanically-supported ecological system. In a preferred embodiment, the biomechanical structure includes biodegradable materials that are nutrient-laden to promote integration and growth of vegetation and establish a structurally-supported ecological system.

EXAMPLES

Figure 7:
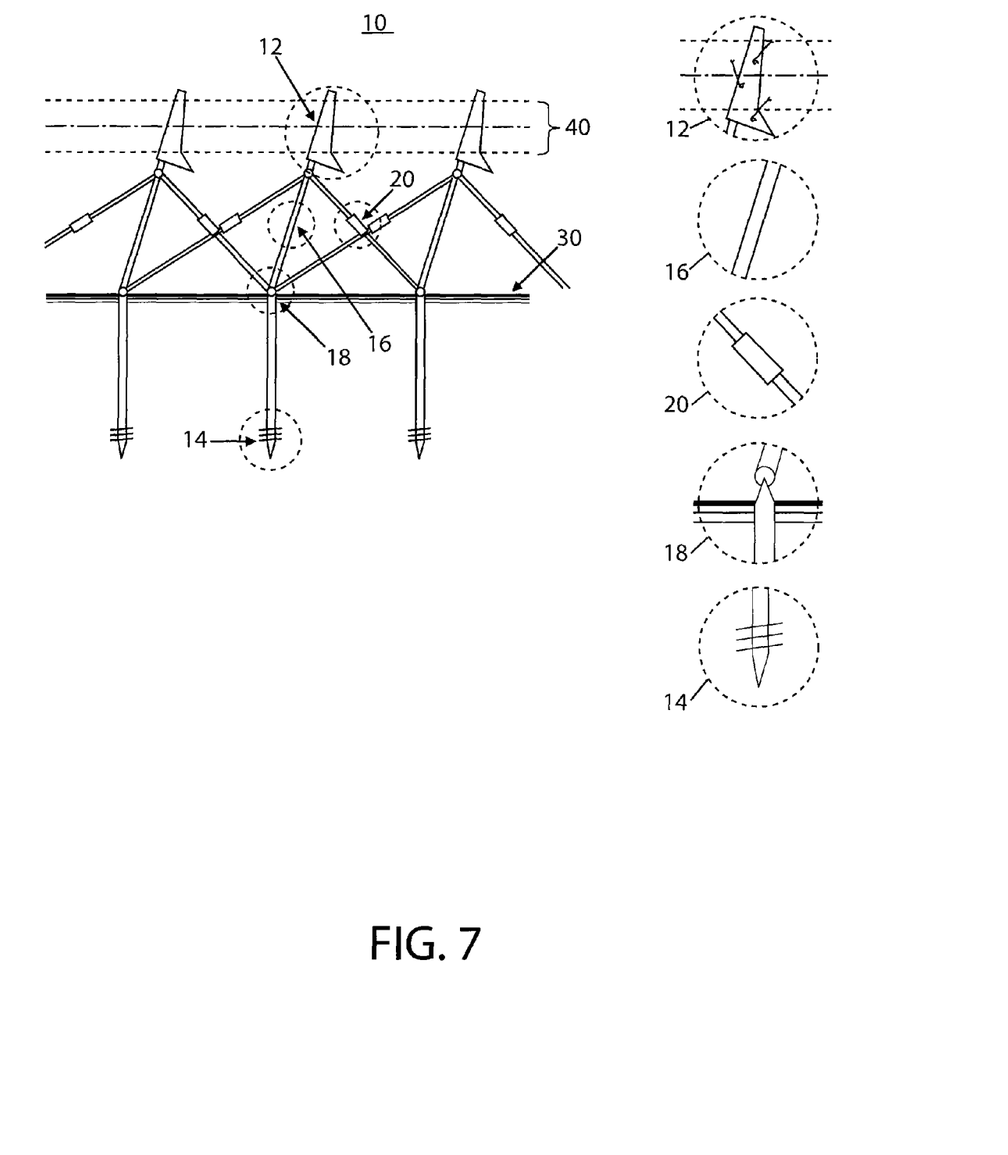
FIG. 7 shows a biomechanical structure according to one embodiment of the present invention.

FIG. 7 show a biomechanical structure assembly according to one embodiment of the present invention. As shown, the assembly 10 utilizes a seedling capture device 12 to capture and retain seedlings from suspension. The seedling capture device can be positioned within the anticipated wave height range 40. The assembly is fixed into the landmass or sea bed 30 by an anchor device 14. The seedling capture device and the anchor device are connected by a member 16, which in this embodiment is a vertical compression member, which is connected at the anchor end by a movable connection 18. The seedling capture end of the vertical compression member may also be a movable connection, or it may be a fixed connection, depending on the desired parameters of the assembly. Connection members 20 may be employed, for example, to connect the assembly to similar assemblies within the biomechanical structure or to other structures within the biomechanical system. The connection member shown in this embodiment is a connection member that employs a linear-oriented energy conversion device, such as a linear compression mechanism, for wave energy harvesting and electric energy power generation.

Figure 8:
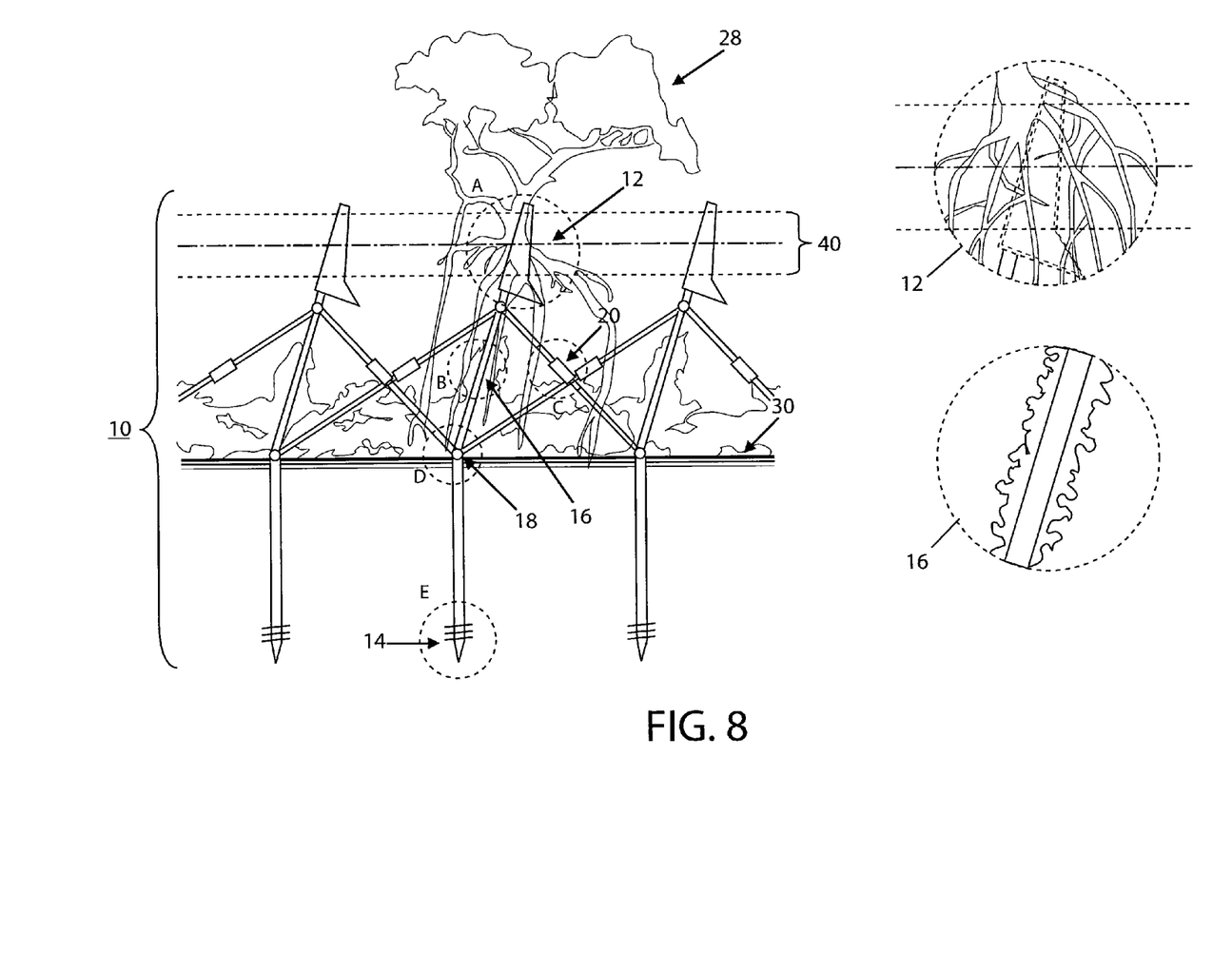
FIG. 8 shows the biomechanical structure of FIG. 7 integrated with a native vegetation ecosystem.

FIG. 8 shows the biomechanical structure of FIG. 7 integrated with a native vegetation ecosystem. The seedling capture device 12 initially captures and retains the seedling particle from suspension. In deep-water conditions, the present system may elevate the planter substrate at the seedling capture device to create a tidal zone attachment surface within the natural range of waterborne seedlings. This method enables the seedling to grow without a soil substrate. The seedling may initially take root in the elevated planter substrate of the seedling capture device 12. Once established, successive root growth may extend downward to the sea bed 30 by gravitational pull. Over time, a native vegetation tree 28 becomes integrated with the biomechanical structure assembly to establish a biomechanically-supported ecological system. The biomechanical structure assembly may utilize electric energy to promote biodeposition of the seedlings or electrodeposition of seawater constituents, such as calcium, on the system's structural members. Seawater constituents themselves may attract or provide nutrition for vegetation or sea life, as is the case for calcium deposits and oyster colonization. Such calcium electrodeposition is depicted in the visual enlargement of member 16 shown in FIG. 8. Accordingly, the biomechanical structure assembly shown in FIGS. 7 and 8 provide a myriad of ecological services including, for example, soil bed and landmass retention, wave energy dissipation and harvesting, particle suspension, seedling capture, vegetation support, and sea life habitat.

Figure 9:
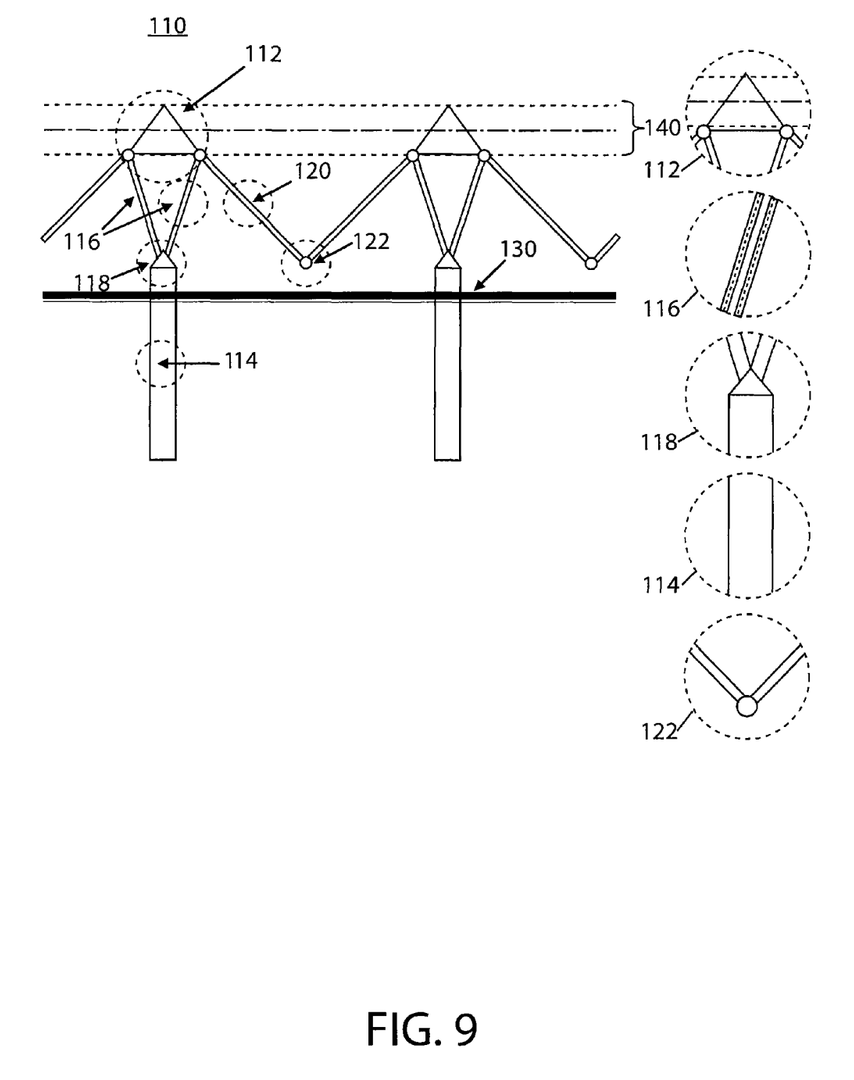
FIG. 9 shows a biomechanical structure according to another embodiment of the present invention.

FIG. 9 show a biomechanical structure assembly according to another embodiment of the present invention. As shown, the assembly 110 utilizes a seedling capture device 112, such as a basket or mesh, to capture and retain seedlings from suspension. Again, the seedling capture device can be positioned within the anticipated wave height range 140. The assembly is fixed into the landmass or sea bed 130 by an anchor device 114. The seedling capture device 112 and the anchor device 113 are connected by multiple members 116, which in this embodiment are semi-flexible strut members at least partially comprised of laminated piezoelectric patch materials. The members are connected at the anchor end by a fixed connection 118.

Connection members 120 may be employed, for example, to connect the assembly to similar assemblies within the biomechanical structure or to other structures within the biomechanical system. The connection member 120 shown in this embodiment is a connection member that employs a piezoelectric material for wave energy harvesting and electric energy power generation. This embodiment shows that the connection members 120 of adjacent assemblies are connected by a movable connection 122. In this embodiment, the connection members 120 are also connected to the seedling capture device 112. The seedling capture end of the connection member may also be a movable connection, as in this embodiment, or it may be a fixed connection, depending on the desired parameters of the assembly. As stated above and appreciated by one having ordinary skill in the art, design parameters such as connection types, number of members, dimensions, materials, and other characteristics of the biomechanical assembly, structure, and system can be adapted to meet the ecological demands and other requirements of the coastal morphology.

Figure 10:
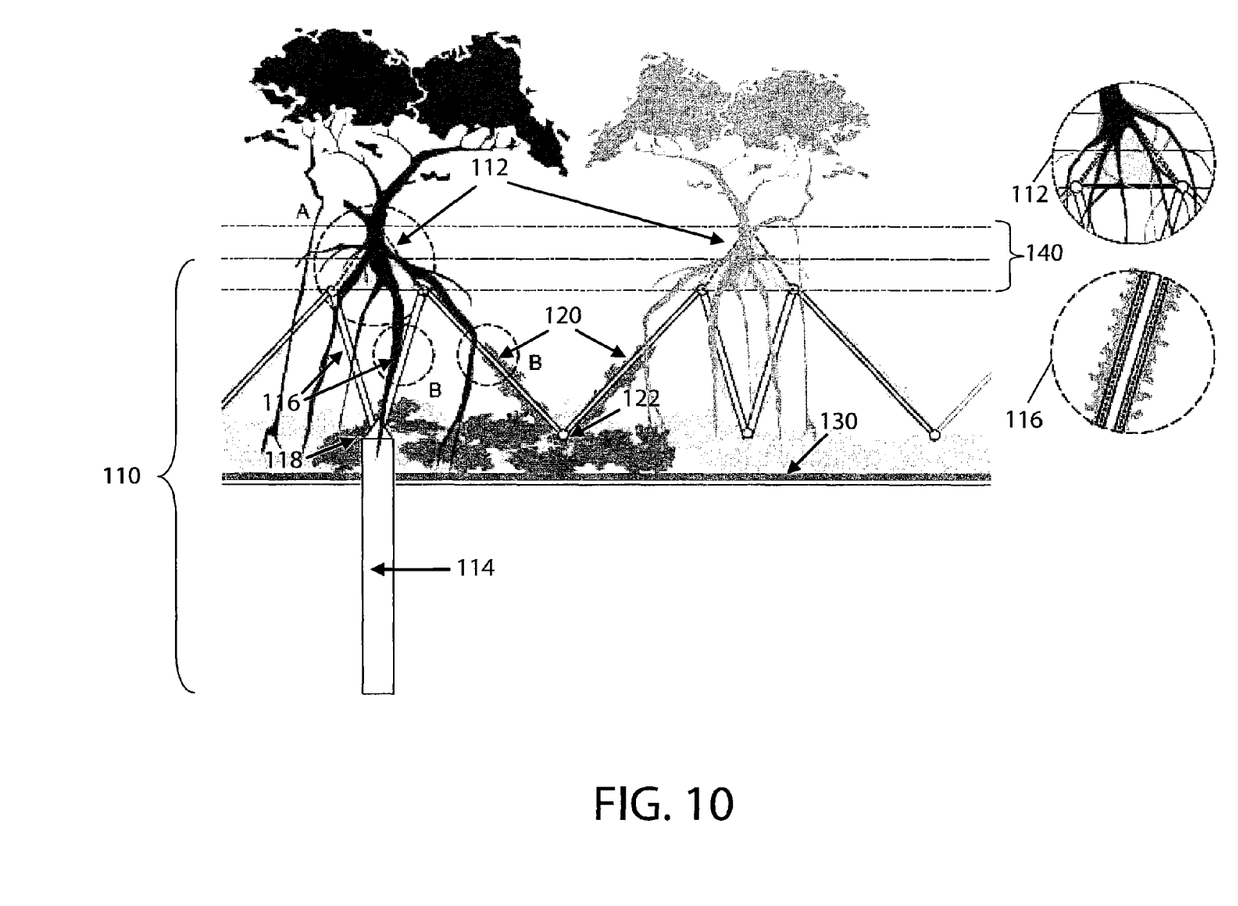
FIG. 10 shows the biomechanical structure of FIG. 9 integrated with a native vegetation ecosystem.

FIG. 10 shows the biomechanical structure of FIG. 9 integrated with a native vegetation ecosystem. The seedling capture device 112 initially captures and retains the seedling particle from suspension. The assembly may be sized and configured such that the seedling capture device 112 is positioned in the optimal range to capture, retain, and nurture the seedling. By providing an artificial bed for root branching and integration, embodiments of the present invention enable seedlings to grow without a soil substrate. As stated above, components of the present invention may be nutrient-laden to foster successful seedling growth and root development. As the vegetation grows, its root structure may extend downward to the sea bed 130 by gravitational pull. Over time, the native vegetation becomes integrated with the biomechanical structure assembly to establish a biomechanically-supported ecological system. The biomechanical structure assembly may also utilize electric energy, such as that harvested or generated from wave energy by the structure itself, to promote biodeposition of the seedlings or electrodeposition of seawater constituents, such as calcium, on the system's structural members.

Figure 11:
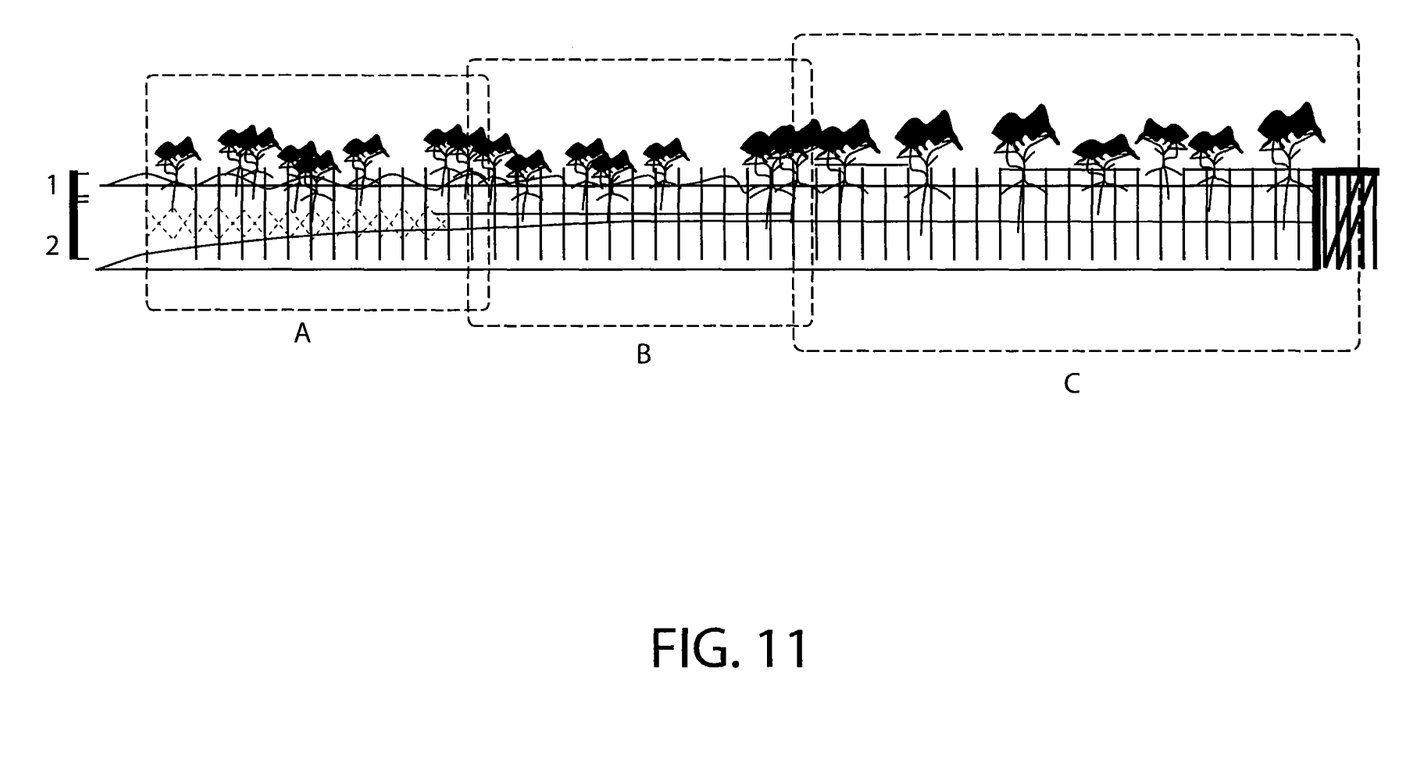
FIG. 11 shows one embodiment of the biomechanical system according to the present invention which incorporates one or more of the biomechanical structures.

The biomechanical systems of the present invention may be configured to incorporate a multitude of biomechanical structures, either in distinct zones or interspersed throughout the system. For example, specific biomechanical structures may be incorporated primarily for structural support, anchoring of vegetation, and soil retention. Other biomechanical structures may be utilized for wave energy dissipation and flexibility. FIG. 11 shows an example of a biomechanical system configuration which incorporates a variety of biomechanical structures, to correspond with the desires of the overall biomechanical system, the demands of the local ecosystem, and to become integrated with the coastal morphology. Zone 'A' of the system embodiment shown in FIG. 11 is the seaward end, while zone 'C' is the landward end which, in this embodiment, abuts a static sea wall. In this system embodiment, zone 'A' is comprised generally of biomechanical structures which are suitable for seedling capture, biodeposition, and flexibility. For example, the biomechanical structures in this zone may be configured to have large seedling capture baskets, be constructed of nutrient-laden, porous composite materials to instigate biodeposition, be movably connected (i.e., flexible), and be allowed to float (i.e., not fixed to the sea bed). The landward portion of zone 'A' may overlap with the seaward portion of zone 'B' to provide a transition zone, or there may be a sharp demarcation between zone 'A' and zone 'B'.

In the system embodiment shown in FIG. 11, zone 'B' is comprised generally of biomechanical structures which are suitable for seedling suspension and capture, soil retention, and wave energy dissipation and power harvesting or generation. For example, the biomechanical structures in this zone may be configured to have meshed seedling capture devices, be constructed of power generation materials and/or include power generation components, have pseudo-flexible interconnectivity, and be movably fixed to the sea bed. Again, the landward portion of zone 'B' may overlap with the seaward portion of zone 'C' to provide a transition zone, or there may be a sharp demarcation between zone 'B' and zone 'C'. Zone 'C' may be comprised generally of biomechanical structures which are suitable for strength and structural permanence, soil retention, and act as habitats for both flora and sea life. For example, the biomechanical structures in this zone may be configured to have meshed seedling capture devices, have biodeposition and electrodeposition characteristics, be constructed of rigid materials such as metals, and be firmly fixed to the sea bed and/or sea wall.

The biomechanical structures and assemblies incorporated into the zones described in FIG. 11 may additionally be configured to meet the particular nature of the regional wave patterns, coastal morphology, and local ecosystem. For example, an upper section of the assemblies, identified in the figure as section '1', may be configured for movement while a lower section of the assemblies, identified in the figure as section '2', may be configured for structural rigidity. Such a design may enable the system to employ kinetic or flexible materials in section '1' and stable or rigid materials in section '2', and provide optimal performance for a specific coastal morphology. As appreciated by one having ordinary skill in the art, each of these zones may include more than one type of biomechanical structure or assembly. Additionally, while 3 zones are shown in the embodiment of FIG. 11, the biomechanical systems of the present system may have as many or as few zones, structures, or assemblies as necessary or desired to meet to goals of the coastal remediation system.

As shown by the Figures and described herein, the biomechanical structures and systems of the present invention reduce storm wave energy and provide protective measures to existing urban areas that lack natural landscape features as a result of historical patterns of development. The recent catastrophes of Hurricane Katrina (2005) and the Indian Ocean Tsunami (2004) emphasize the overexposure of the world's coastlines to climate catastrophe and demonstrate the need for regenerative coastal boundaries that support the larger ecological functioning of these regions. Accordingly, the present invention provides structures and methods for wave energy dissipation and harvesting, soil retention, and vegetation support which may be employed to remedy existing coastlines and prevent future coastline erosion.

It will be understood that the geometry of the embodiments of the present invention is not limited to the specific shapes shown in the Figures, described above, or presented in the Examples. Alternate shapes may be used to achieve specific performance or aesthetics, while addressing other design concerns, such as structural material and remediation environment. Although the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. A biomechanical structure for coastline remediation which comprises one or more structural assemblies, each structural assembly comprising:
    an anchor that is either configured to float in water or be fixed to a coastal landmass;
    an extension member having one end that is movably connected to the anchor; and
    a seed capture device for capturing and retaining seeds, the seed capture device being connected to an opposite end of the extension member so that the seed capture device is positioned at an elevation corresponding to an anticipated wave height range,
    wherein the extension member comprises biodegradable materials which are seeded and nutrient-laden.

2. The biomechanical structure of claim 1, wherein the anchor is a fixed anchor.

3. The biomechanical structure of claim 2, wherein the fixed anchor is a caisson, screw, or pile foundation.

4. The biomechanical structure of claim 1, wherein the anchor is a floating anchor.

5. The biomechanical structure of claim 4, wherein the floating anchor is a vibroflotation anchor.

6. The biomechanical structure of claim 1, wherein the one or more structural assemblies are staggered, inline, or semi-random in configuration.

7. The biomechanical structure of claim 1, wherein the extension member is comprised of metals, composites, polymers, biodegradable materials, or combinations thereof.

8. The biomechanical structure of claim 1, wherein the seed capture device comprises a basket or mesh.

9. The biomechanical structure of claim 1, further comprising a connection member having one end that is connected to the opposite end of the extension member, and an opposite end of the connection member that is either configured to float in water or be fixed to the coastal landmass.

10. The biomechanical structure of claim 1, further comprising a piezoelectric element mounted to the structure that is positioned at an elevation corresponding to an anticipated wave height range.

11. A biomechanical structure for coastline remediation which comprises one or more structural assemblies, each structural assembly comprising:
- an anchor that is either configured to float in water or be fixed to a coastal landmass;
- an extension member having one end that is movably connected to the anchor; and
- a seed capture device for capturing and retaining seeds, the seed capture device being connected to an opposite end of the extension member so that the seed capture device is positioned at an elevation corresponding to an anticipated wave height range, wherein the structural assemblies incorporate one or more components for mechanical or material power generation, such that power generated can be used to stimulate biodeposition of fauna and electrodeposition of minerals over the extension member.

12. A biomechanical structure for coastline remediation which comprises a plurality of structural assemblies, each structural assembly comprising (i) an anchor that is either configured to float in water or be fixed to a coastal landmass; (ii) an extension member having one end that is movably connected to the anchor; (iii) a seed capture device for capturing and retaining seeds, the seed capture device being connected to an opposite end of the extension member so that the seed capture device is positioned at an elevation corresponding to an anticipated wave height range; and (iv) a connection member having one end that is connected to the opposite end of the extension member, and an opposite end that is either configured to float in water or be fixed to the coastal landmass, wherein the connection members of adjacent structural assemblies are connected to each other, wherein the extension member comprises biodegradable materials which are seeded and nutrient-laden.

13. The biomechanical structure of claim 12, further comprising a piezoelectric element mounted to the structure that is positioned at an elevation corresponding to an anticipated wave height range, such that power generated can be used to stimulate biodeposition of fauna and electrodeposition of minerals over the structure.

* * * * *